Dec. 18, 1951   R. E. S. SWAM   2,579,130
AUTOMATIC STARTING AND STOPPING OF DIESEL ENGINES
Filed Sept. 14, 1945   2 SHEETS—SHEET 1
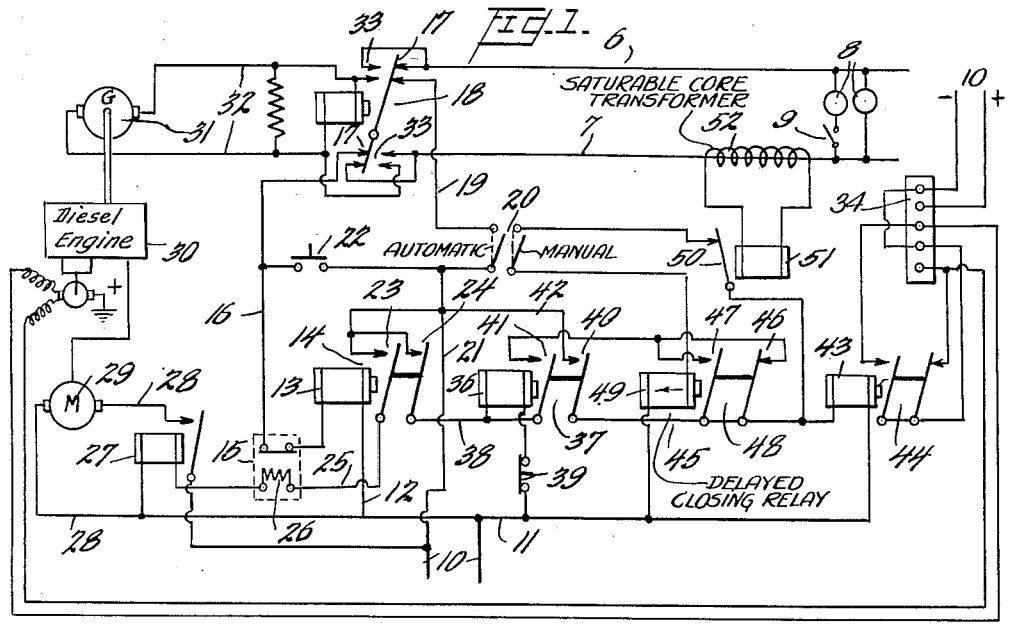
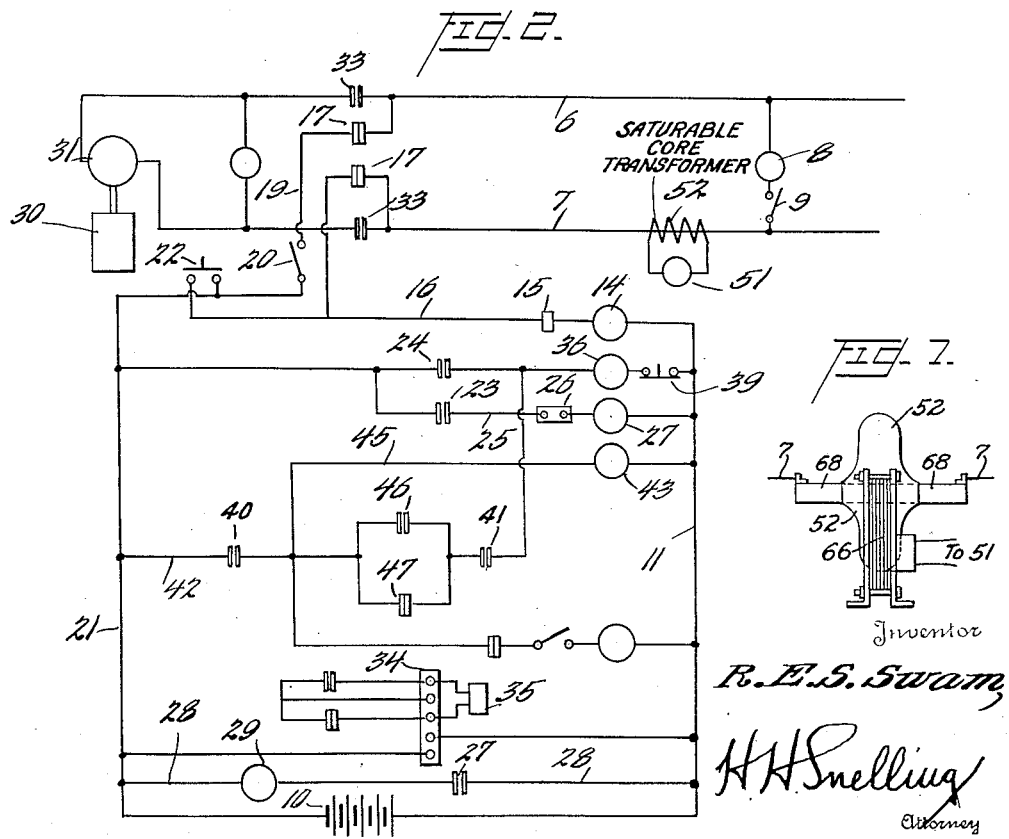

Dec. 18, 1951  R. E. S. SWAM  2,579,130
AUTOMATIC STARTING AND STOPPING OF DIESEL ENGINES
Filed Sept. 14, 1945  2 SHEETS—SHEET 2
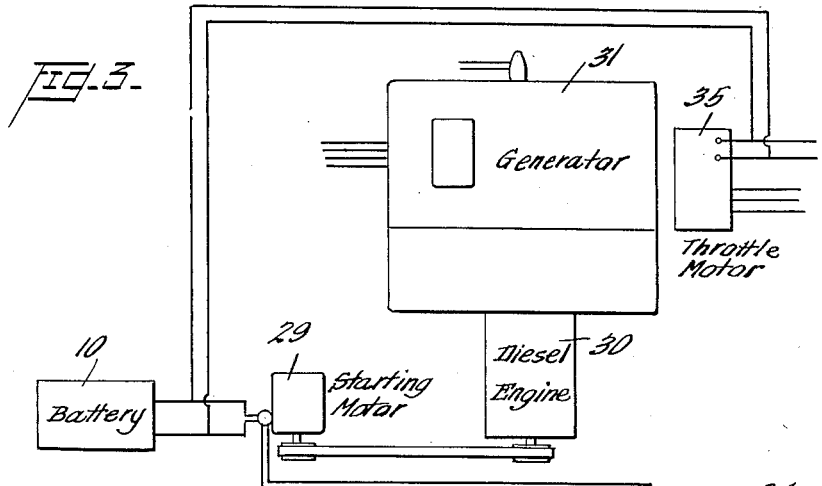
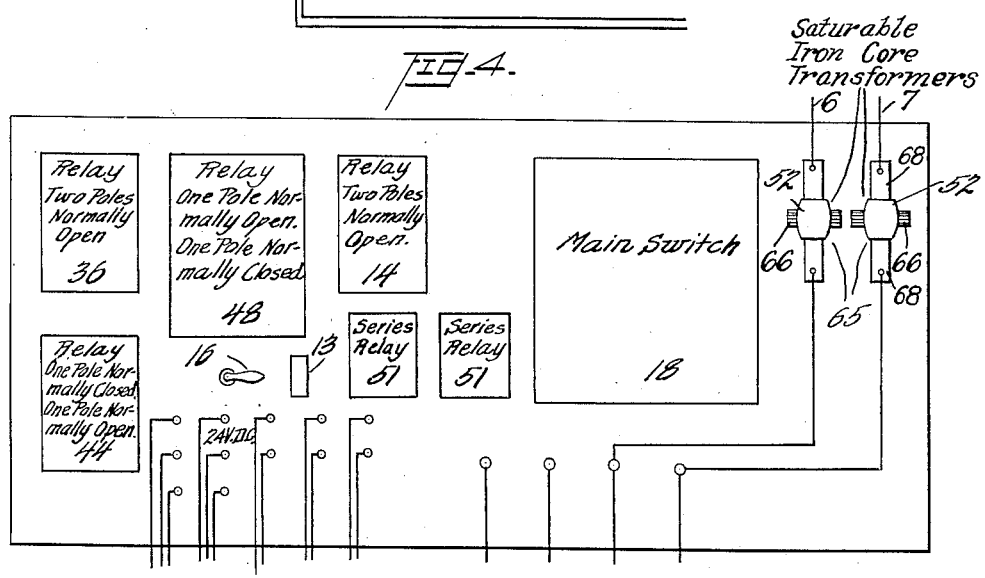
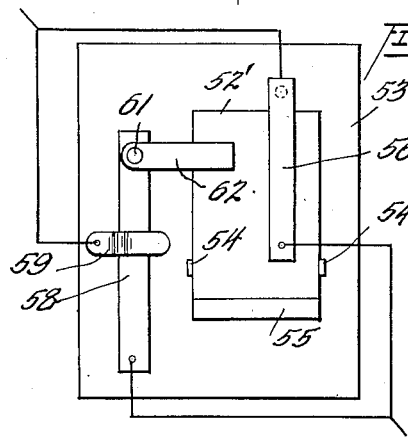
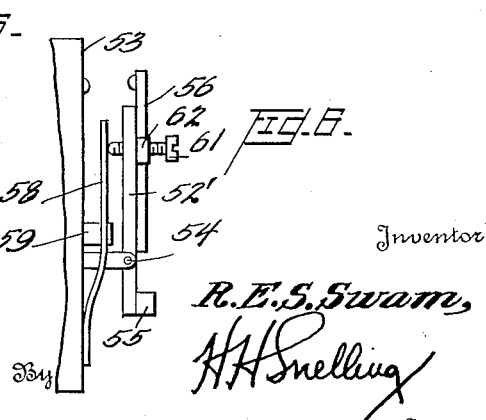
Inventor
R. E. S. Swam,
H. H. Snelling
Attorney

Patented Dec. 18, 1951

2,579,130

UNITED STATES PATENT OFFICE 2,579,130

AUTOMATIC STARTING AND STOPPING OF DIESEL ENGINES

Roland E. S. Swam, Hanover, Pa., assignor to Richard H. Sheppard, Hanover, Pa.

Application September 14, 1945, Serial No. 616,289

24 Claims. (Cl. 290—30)

This invention relates to electrically controlled starting devices for putting power plants in operation and has for its principal object the provision of a system that will automatically start a Diesel engine driven generator upon a small demand for current. An important object of the invention is to provide a fully reliable system for starting and stopping a Diesel engine driving a plant of any kind in accordance with irregularly timed demands for power and preferably one in which the engine may be started in operation by a power demand as small as one per cent of the rated capacity of the engine. The engine may drive a compressor, a pump, or any other mechanism where automatic starting and stopping is desirable.

An incidental but important object of the invention is to provide means for carrying the full load through the primary of a transformer while the secondary of the transformer is connected to a sensitive relay, without burning up its coil. This is accomplished by materially altering the characteristics of the transformer in series with the coil so that the saturation curve of the iron core of the transformer is flattened at a very early point, whereby the current flow thru the coil rises with the current flow to the load up to perhaps three amperes but then is held at this figure while the load flow increases to say twenty-five amperes. In this way the current flow through the sensitive relay is well below the amount that would injure it, and while the transformer is a "poor" one for general purposes, it enormously increases the life of the relay used with it.

The invention is particularly concerned with the arrangement of an auxiliary circuit provided with specialized controlling means that enables a Diesel engine to be used in a system wherein a generator for supplying a main-current-consuming circuit is driven by an internal combustion engine, and an auxiliary circuit including a current source is arranged to start the engine through a starting or cranking motor upon application of a load to the main line or circuit.

Operation of gasoline engines for systems of this kind has been developed to a point where such operation is completely automatic, practical and satisfactory; but the essential differences between Diesel and gasoline engines are such that the former kind of engine cannot be readily substituted for a gasoline engine in a completely automatic system. The electrical ignition systems of gasoline engines lend themselves to control of such engines by means of electrical conditions prevailing in the circuits of demand electrical systems under different conditions, whereas the absence of electric ignition in Diesel engines raises difficulties in the employment of engines of this kind in these systems. Diesel engines normally must be controlled by their fuel supply throttles, and electrical control of the throttles presents certain problems, particularly in a demand electrical system provided with such highly desirable arrangements as changeover means for switching an auxiliary circuit out of the main circuit after the generator voltage has built up and to simultaneously switch the generator into supplying relation with the main circuit. Another such arrangement in a system of this kind is a starting motor-controlling switch operated to interrupt the current supply of the motor upon starting of the generator-driving engine.

The provision of demand-started systems with such controlling devices precludes the control of a Diesel engine throttle directly from the starting motor supply circuit or from the control circuit that actuates the motor, and from direct control by the energization of the main circuit.

An important object of the invention is to provide a satisfactory and practical system included in a demand-started system for completely automatic operation of a Diesel engine arranged to drive the generator, including a novel circuit for controlling operation of a throttle-actuating electric motor.

Another object of the invention is the provision of a novel arrangement of interrelated relays, by means of which proper control of a starting motor and of a throttle-controlling motor is effected by loading of the main current-consuming circuit and breaking of the main circuit to effect completely automatic operation of a Diesel engine that drives a generator for supplying the main circuit.

Still another object is the provision of such an arrangement of relays that is cooperative with automatic changeover switching means, and with a device for automatic cut out of operation of the starting motor upon starting of the generator-driving engine, whereby the throttle is opened upon energization of the starting motor, maintained open during operation of the generator-driving engine, and closed immediately upon interruption of the main circuit.

These objects are accomplished by the circuit arrangements disclosed in the accompanying drawings, wherein:

Figure 1 is a wiring diagram of a system arranged in accordance with the invention.

Figure 2 is a schematic diagram of the same system.

Figure 3 is a plan of the engine connections.

Figure 4 is a diagram of the control board.

Figure 5 is a view of the time delay relay.

Figure 6 is a side view of Fig. 5.

Figure 7 is a side view of a transformer.

Describing the drawings in detail, the main circuit comprises current-carrying lines 6 and 7, and is indicated as including loads 8 that may be included in the circuit by switches such as 9. An auxiliary controlling circuit-source 10 of direct current, as a battery supply of 24 volts for example, is connected by a bus 11, line 12, the operating coil 13 of a main or primary relay 14, the contacts of a thermal cut out switch 15, line 16 and one contact of a changeover switch 18, to the line 7 of the main circuit, while the other line 6 of the main circuit is connected to the other side of the source 10 through a second contact of the changeover switch 18, a line 19, one set of contacts of a dipole switch 20, and line 21. A manual starting switch 22 is arranged to connect lines 16 and 21, to energize the coil 13 of the primary relay 14 in case manual starting of the generator is desired. Otherwise this relay coil 13 is energized by connection of a load, as 8, into the main circuit. Automatic operation of the system may be prevented by opening the switch 20, which renders the system subject to manual starting only.

The primary or main relay 14 has two pairs of contacts 23 and 24 that are closed upon energization of the coil 13, both of these contact pairs being connected to one side of the direct current source 10 through the line 21. The first pair 23 of these contacts is connected through a line 25 and the heating element 26 of the thermal cut-out 15 to the actuating coil of a relay 27 arranged to close the supply circuit 28 of the starting motor 29 of a Diesel engine 30 that drives the generator 31 to supply the main circuit with current.

The output lines 32 of the generator 31 respectively are connected through a second set of contacts 33 of the changeover switch 18 to the circuit lines 6 and 7. The contacts 17 and 33 are so arranged that upon energization of the relay coil of the switch by generator current flowing therein the contacts 17 are opened and those 33 closed, disconnecting the auxiliary circuit from the main circuit 6, 7 connecting the generator with it to supply it with generator current.

It will be seen that the circuit arrangement so far described acts to energize the coil 13 of the relay 14 upon connection of a load in the main circuit 6, 7, which coil closes contacts 23 to energize the relay 27 and start the cranking motor 29. Upon starting of the main generator 31 by the Diesel engine, the relay-operated changeover switch 18 operates to disconnect the auxiliary or battery circuit and connect the generator to the main circuit.

A throttle motor panel 34 is arranged to supply a suitable throttle-controlling motor 35. The controlling panel 34 is subject to control by the primary relay 14 to operate the throttle motor to open the throttle upon energization of the relay 27 that actuates the cranking motor 29, and to maintain the motor 35 in condition to hold the throttle open while and after the starting motor 29 has been stopped by the circuit arrangement now to be described.

The operating coil 36 of a holding relay 37 is connected to one side of the current source 10 through line 21, the second pair of contacts 24 of the relay 14 and a line 38, and to the other side of the source 10 by way of a manual stop switch 39 and the bus 11. The relay 37 has two pairs of contacts 40 and 41, one of which 40 is connected to the source line 21 by a feeder line 42, which it connects to the coil 43 of a throttle motor panel-controlling relay 44 by a line 45, the other side of the coil 43 being connected to the bus 11. The second pair of contacts 41 of the relay 37 controls a holding circuit for maintaining the coil 36 energized independently of the operation of the relay 14 once such energization has been initiated. To this end, one of the contacts of the pair 41 is connected to the same end of the coil 36 as are the contacts 24 of the relay 14, and the other to the line 21, through switch contacts 46 or 47, line 45, switch contacts 40, and line 42. Such connection of line 45 to line 21 by contacts 40 also causes energization of the coil 43 of the panel-controlling relay 44 because the other side of this coil 43 is connected to the bus 11 as mentioned above.

The relay 48 is actuated by a coil 49, and the moving parts of this relay are so arranged that upon energization of the coil 49 the contacts 46 will be immediately open and the contacts 47 will be closed after a predetermined delay, while upon deenergization of the coil 49 the contacts 47 will immediately be opened and the contacts 46 will be closed. The delay between the opening of contacts 46 and the closing of contacts 47 is of no moment during the starting cycle but is of importance when energization of coil 49 of this relay 48 is caused by the closing of contacts 50 due in turn to absence of load, i. e., no current flowing thru the output lines 6—7. This delay period is selected to be sufficiently long to permit the holding relay 37 to become deenergized by the breaking of the contacts 46 to permit opening of the holding contacts 40 of the relay 37, it being remembered that at this time relay contacts 23 and 24 are open, whereas the shift that opens contacts 47 and closes contacts 46 is made too rapidly to permit relay 37 to deenergize.

The coil 49 of the time-delay relay 48 is included in a circuit that connects the bus 11, through the coil 49 to a second pair of contacts of the dipole switch 20, and the contacts of a solenoid-operated switch 50 to the line 45, between the coil 43 of the relay 44 on one side and the contacts 40 of the relay 37 and the parallel sets of contacts 46, 47 of the time-delay relay 48 on the other side. The switch 50 is operated by a solenoid 51 coupled inductively to the main circuit by a secondary coil 52 in such manner that the switch 50 is opened to deenergize the coil 49 of the relay 48 upon flow of generator current in the main circuit 6, 7.

Relay 48 is a time-delay relay with one normally open and one normally closed contact. The panel supported studs or contact points of each pair of contacts are normally connected to one of the normally open contact points of holding relay 37 and the movable studs of relay 48 are connected to the opposite side of the other contact of holding relay 37 and also to the coil 43 of panel controlling relay 44. The coil 49 of the time-delay relay 48 is in circuit with the battery only when the coil 36 of holding relay 37 is energized and no current is flowing through the line 6—7. One simple way which the desired time control is secured is by means of the plate 52' (see Figs. 5 and 6) pivoted to the base 53 as at 54, and biased to position away from the coil 49 by the weight 55. This makes the right hand pole normally open as the contact point on bar 56, insulated from the plate, moves away from the contact point on the base. The other pole is normally closed as the spring 58 rests on the stop 59 fast to the base 53. This current carrying spring 58 is engaged by an adjustable screw 61 in bar 62 movable with the pivoted plate with its engaging end nearer to the pivot 54 of the plate than are the contact points of the normally open contact.

The primary 68 of the transformer 65 must carry the same large current as the load lines but the current thru the secondary must be kept low so as not to burn out the sensitive relays which operate the switches 50. In a simple circuit there is but one transformer and one switch; in a three wire system, there are two transformers and two switches 50, etc. These transformers 65 are saturable core current transformers and are therefore what would be considered "poor" in other uses, as their characteristics have been made such that while at start the two currents in the primary and secondary windings are about the same, the curve showing their relations flattens out at about three amperes and this then is the maximum flow through the coil 52 even when the load line current rises to 25 amperes, for example. A 15 K. W. plant may readily be started with a load of under 200 watts, in fact the Diesel engine has repeatedly been started by turning on a single 25 watt lamp, provided the latter is cold (not just turned off and then immediately turned on again). As will be understood, the iron core 66 of the transformer is saturated at the 3 ampere load and therefore transmits only this amount of current to the coil of the relay controlling one of the switches 50.

The operation of the circuit is as follows: When relay 14 is energized by flow of current through its coil 13, and simultaneously with closing of contacts 23 to actuate the relay 27 and start the cranking motor 29, the relay 37 is energized, closing its holding circuit which includes contacts 40, 41, and 46 or 47, as well as line 45, all of which also serve to close the circuit of coil 43 of the throttle-motor-controlling relay 44. The relay 44 in its energized position actuates the throttle motor 35 to open the throttle of the engine, so that this operation is initiated practically simultaneously with starting of the cranking motor. Upon starting of the engine and building up of the generator voltage, the changeover switch 18 is actuated, opening the contacts 17 and thereby breaking the circuit of the coil 13 of the primary relay 14 and de-energizing the supply circuit of the starting motor 29 to stop the latter. At the same time the generator is connected into the main circuit and supplies current to the load included in that circuit. Although the relay 14 is de-energized, and the contacts 24 through which the holding relay 37 was energized are opened, the latter relay 37 is maintained energized by reason of the holding circuit established through its coil 36 by its holding contacts 40, therefore, the relay 44 remains energized, maintaining the throttle-operating motor in operation to hold the throttle open.

The holding action of the relay 37 is stopped upon interruption of current flow in the main circuits 6, 7, but is maintained as long as the specialized relay 43 is kept de-energized by the magnetic contactor switch 50 which holds the circuit of coil 49 open so long as the main circuit draws current from the generator. When, due to the stopping of the generator 31, the change over switch 18 closes the four contacts 17 thereby energizing the primary relay 14 which energizes the holding relay 37, the coil 49 of time-delay relay 48 is energized, closing the contacts 47. When generator current flows in the circuit 6, 7, the coil 51 is inductively energized, opening the switch 50, de-energizing the coil 49, and effecting closing of the contacts 46 and opening of the contacts 47, thus maintaining the current supply from the line 45 to the coil 36 of the holding relay 37, and also maintaining energization of the relay 44 and open condition of the engine throttle, while the main relay 14 is de-energized to stop the cranking motor by operation of the changeover switch 18.

Upon opening of the main circuit 6, 7, the magnetic contactor 51 is de-energized, the switch 50 is closed, energizing the coil 49, and thereby opening the contacts 46 and effecting a delay in the closing of the contacts 47 sufficient to permit the holding contacts 40 of the relay 37 to open due to de-energization of the coil 36. Upon de-energization of the relay 37 the circuit of the relay 44 is broken and the throttle motor is reversed to effect closing of the engine throttle, thereby stopping the engine.

What I claim is:

1. In combination a Diesel engine, a starting motor for the engine, a throttle control for the engine, means automatically controlled in response to a demand for power for energizing the motor and for moving the throttle control to open position, said means including a time delay relay and a throttle opening and closing relay, a source of electric current controlled by said time delay relay, and means for energizing the time delay relay for a short period upon absence of demand for power.

2. In combination, a Diesel engine, a generator driven thereby, a battery operated starting means, a battery operated throttle control means, a transformer in the generator-load circuit supplying secondary current to break the battery circuit when the generator is furnishing current to the load, a relay having its energizing coil connected with the secondary of the transformer and its contacts in the battery circuit for making and breaking the circuit, said transformer having an iron core, a primary winding and a secondary winding, said core being electrically "poor" whereby same is saturated at one-tenth of the rated capacity of the primary, so that as the current increases from zero to ten per cent in the primary the current in the secondary will correspondingly increase but will then remain approximately constant as the current through the primary increases from 10% to full rated capacity.

3. The combination with a Diesel engine of the type having a throttle movable between open and closed positions, of electrically operated means for cranking the engine, electrically operated means for opening the throttle in response to a demand for power and for closing the same when such demand ceases, and means for de-energizing the first-named means in response to a normal running speed of the Diesel engine.

4. The device of claim 3 in which the throttle control means includes a reversible motor and means for reversing the operation of the motor.

5. The combination with a Diesel engine having a throttle, of electrically operated means for cranking the engine, electrically operated means for opening the throttle in response to a demand for power and closing the same when such demand ceases, means for de-energizing the first named means in response to a normal running speed of the engine, an alternating current generator driven by the engine and having a load circuit, a battery for operation of the cranking means and the throttle opening means, a transformer in the load circuit having a primary and a secondary, and means operated by the secondary to disconnect the battery when the generator is furnishing current to the load circuit.

6. The system of claim 1 including an alternating current generator driven by the Diesel engine, a power circuit fed by the generator, the time delay relay energizing means including a transformer with a secondary and a primary in said power circuit and a magnetically operated switch connected with the secondary of the transformer to open the energizing circuit of the time delay relay while current is being delivered by the generator to the power circuit.

7. In combination, a Diesel engine, a starting motor for the engine, a throttle for the engine, means automatically controlled in response to a demand for power for energizing the motor and for moving the throttle to open position, said means including a time delay relay and a throttle opening and closing relay, a source of electric current controlled by said time delay relay, and means for energizing the time delay relay upon absence of demand for power, the last named means including a transformer with a secondary winding and a magnetically controlled switch in series with the secondary winding.

8. In a demand-started electrical system comprising a main circuit, a generator for supplying such circuit, an auxiliary circuit connected to the main circuit for energization in response to loading of the main circuit, and an electric engine-starting motor connected to be started in response to energization of the auxiliary circuit; a Diesel engine having a throttle and connected to drive the generator and to be cranked by the starting motor, means actuated by the energization of the auxiliary circuit for opening the throttle of the engine, and means for maintaining it open during the operation of the generator while the generator is supplying current to a load and for closing it upon the opening of the main circuit connection with the load.

9. In a demand-started electrical system comprising a main circuit, a generator for supplying such circuit, an auxiliary circuit connected to the main circuit for energization in response to loading of the main circuit, means for de-energizing the same in response to operation of the generator, and an electric-engine starting motor arranged to be started in response to energization of the auxiliary circuit; a Diesel engine having a throttle and driving the generator and to be cranked by the starting motor, an electric motor connected to open the throttle of said engine when supplied with current, a relay included in the auxiliary circuit and connected to supply energy to the throttle-operating motor upon energization of the auxiliary circuit to open the engine throttle, and means coupled to the main circuit for maintaining the throttle motor supplying relay energized independently of the auxiliary circuit during flow of generator current in the main circuit and for interrupting such energization upon unloading of the main circuit.

10. In a demand-started electrical system including a main circuit, a generator for supplying said circuit, a throttle controlled engine for driving said generator, an auxiliary circuit arranged for energization in response to loading of the main circuit and de-energization in response to operation of the generator and a engine-cranking motor connected to be started in response to energization of the auxiliary circuit and to be stopped upon de-energization of such circuit; the combination of an electric motor for opening and closing the throttle of the engine, a relay connected to initiate energization of said throttle-opening motor in response to energization of the auxiliary circuit, and means for maintaining said relay energized independently of de-energization of the auxiliary circuit, including means coupled to the main circuit for operation by energization by the generator and which, in response to de-energization of the main circuit, is operable to de-energize the said relay.

11. The combination of claim 10 wherein the last mentioned means includes a solenoid operated switch interposed in the auxiliary circuit for initially supplying energy to the relay, the solenoid of said switch being coupled to the main circuit, and means connected to maintain the relay-supply circuit when the main circuit is energized by the generator and said switch is operable in conjunction with the auxiliary circuit to interrupt the circuit of said relay when the main circuit is interrupted.

12. The combination of claim 10 wherein said last mentioned means includes a magnetically operated switch interposed in the auxiliary circuit for initially supplying energy to the relay, a solenoid for said switch is coupled to the main circuit, and means including a time delay switch connected to maintain the relay supply circuit at all times except for a delay period of predetermined time sufficient to permit de-energization of the relay effected by the opening of the magnetically operated switch and occurring in response to de-energization of the main circuit.

13. The combination of claim 10 wherein the said relay is provided with a holding circuit including a time delay switch and its contacts, closed by the relay upon its energization of the auxiliary circuit, and the holding circuit includes a magnetically operated switch having a coil coupled to the main circuit, the said switch being connected to complete the holding circuit at all times except during a predetermined period of time sufficient to permit de-energization of the relay and occurring upon interruption of the main circuit.

14. The combination of claim 10 wherein the relay is provided with a holding circuit including contacts, closed by the relay upon its energization by the auxiliary circuit, and the said holding circuit includes an electro-magnetically operated double throw switch, having a coil and contacts, connected to complete the holding circuit in both of its positions, said switch being constructed to interchange its contacts sufficiently rapidly to maintain energization of the relay thru the holding circuit upon de-energization of its operating coil and to delay the reverse interchange of its contacts sufficiently to permit deenergization of the relay upon energization of said coil, and the energizing circuit of said coil being controlled by a relay responsive to the main circuit for de-energization upon flow of generator current in said main circuit and for energization responsive to the stopping of the generator.

15. In a demand-started electrical system including a main circuit, a generator for supplying said circuit, a Diesel engine for driving the generator, a throttle for the engine, an electric motor for cranking the engine, and an auxiliary circuit for energizing the cranking motor upon loading of the main circuit, including a relay connected to apply power to the cranking motor; a cross-over relay switch normally connecting the auxiliary circuit to the main circuit and operable to disconnect the auxiliary circuit and connect the main circuit to the generator, throttle-actuating means for controlling the Diesel engine comprising an electric motor for operating the throttle, a second relay connected to operate the throttle motor to open the throttle upon energization of the first named relay, and a primary relay connected in the auxiliary circuit and connected to energize both the throttle motor-operating relay and the relay for applying power to the engine cranking motor upon flow of current from the auxiliary circuit to the main circuit.

16. Throttle-operating means for controlling a Diesel engine as set forth in claim 15, including means for de-energizing the primary relay after starting of the Diesel engine, and means for maintaining energization of the throttle motor-controlling relay independently of the primary relay after initiating such energization by the primary relay.

17. Throttle-actuating means for controlling operation of a Diesel engine as set forth in claim 15, wherein a double throw electromagnetically operated switch is connected between the throttle motor-controlling relay and the throttle-controlling motor, means for energizing said electromagnetic operating means of such switch coupled to the main circuit for energization by generator current flowing therein, the throttle motor-controlling relay being connected to maintain its energization independently of the primary relay by the current passing through the said magnetically operated switch, and the said switch being connected to connect the throttle motor-controlling relay to the throttle motor in both of its positions, and being connected to transfer such connection immediately upon de-energization of its coil and to interrupt said connection upon energization.

18. The combination of claim 5 in which said means to disconnect the battery circuit includes a relay in series with the secondary of the transformer, and the transformer has an iron core which is saturated by a load current of three amperes through its primary winding whereby when the current passing through the primary greatly exceeds three amperes, the current passing through the relay is limited to three amperes.

19. The combination of claim 5 in which the transformer has an iron core which is saturated at a fraction of the capacity of the transformer primary circuit.

20. The combination with a Diesel engine having a throttle, of electrically operated means for cranking the engine, electrically operated means for opening the throttle in response to a demand for power and closing the same when such demand ceases, a switch in circuit with the last named means, means for deenergizing said cranking means in response to a normal running speed of the Diesel engine, an electric power supply generator driven by the Diesel engine, a battery for operating the starting means and throttle control means, and means operated in response to current supply by the generator operating said switch, when the generator is furnishing current to the load.

21. The combination with an intermittently operated power circuit, a battery and a generator for feeding same, and a throttle controlled Diesel engine of a normally open battery circuit closed by introduction of a load into the power circuit including a main relay, a switch controlled thereby; a cranking motor relay, a holding relay, a time delay relay and a throttle relay energized by closing of the switch; a cross over relay in the power circuit energized by operation of the generator, and a seventh relay energized by the generator for opening the battery circuit of the time delay relay, said holding relay being de-energized upon stopping of the generator and being maintained energized by the time delay relay as long as the seventh relay is energized.

22. In a system, selectively automatic or manually operated, for starting a Diesel driven generator supplying a power line with an intermittent load; a power line, a battery and a generator for alternately feeding the power line, a cross over switch in the power line, a throttle controlled Diesel engine connected to drive the generator, separate electro-magnetic relays connected in parallel circuits with the battery being respectively a main relay initiating action upon a call for power, a throttle operating relay, a holding relay for energizing the throttle opening relay, and a time delay relay energized by the holding relay; a switch open to break the battery circuit to the time delay relay when the generator is operating, a contact for engagement with said switch when closed, a double pole single throw switch connected to provide automatic action when closed, by connecting the coil of the time delay relay to the contact of the switch opening to de-energize the holding relay on one side and on the other side connecting the power line to the battery, and when open to provide for manual operation; a manual-starting switch for closing to connect the battery with the coil of the main relay, and a normally closed manual stop switch for disconnecting the battery from the coil of the holding relay when the stop switch is open.

23. In combination, an intermittently loaded power circuit, a battery and a generator alternately feeding said circuit, a throttle-controlled Diesel engine for driving the generator, an electric cross over switch relay normally connecting the battery to the power circuit and connected to be energized by the generator to connect the generator to the power circuit; a transformer having a primary in the power circuit, an electrically "poor" core, and a secondary; a relay coil connected to the secondary and having an armature switch biased to open position, and means including the transformer, the cross over switch relay, the armature switch, the power circuit, and the battery for starting the Diesel engine when the power circuit is loaded to a predetermined degree and for stopipng the Diesel engine when the load is withdrawn, said means also including mechanism for opening the throttle as the engine is started, holding it open as the engine runs, and reversing the throttle as the engine stops because of lack of demand on the generator for sufficient power to energize the relay coil connected to the transformer.

24. In combination, an intermittently loaded power line, a battery, a generator, a change-over switch normally connecting the power line to the battery, a solenoid connected to the generator for energizing said switch when the generator is driven, to switch the power line from the battery to the generator, a demand responsive relay, a holding relay, a time delay relay and a throttle control relay, each of said relays having an operating coil with one terminal connected to one side of the battery, means comprising said change-over switch in its normal position, and said power line, when loaded, connecting the other terminal of the demand responsive relay to the other side of the battery whereby the demand responsive relay is energized upon loading of the power line, means comprising said demand responsive relay for connecting the other terminal of the holding relay to the other side of the battery, means comprising the holding relay and the time delay relay in parallel circuits for connecting the other terminal of the throttle relay to the other side of the battery, means comprising the holding relay and the time delay relay for establishing a holding circuit between the other side of the battery and the other terminal of the holding relay whereby when the demand responsive relay is de-energized by operation of the change-over switch the holding relay remains energized, said time delay relay having a quick action upon de-energization and a delayed action upon energization, means for energizing said time delay relay comprising a transformer having a secondary winding coupled to the power line and connected to energize a sixth relay having a closed switch in its de-energized position completing the connection of the time delay relay coil with the other side of the battery whereby upon unloading the power line, the switch of the sixth relay is closed to energize the time delay relay to interrupt the holding circuit and deenergize the holding relay and the throttle relay, and means comprising a reversible motor connected with the throttle relay to start the generator driving engine when the relay is energized and to stop the engine when the relay is de-energized.

ROLAND E. S. SWAM.

REFERENCES CITED

The following references are of record in the file of this patent:

UNITED STATES PATENTS

| Number | Name | Date |
|---|---|---|
| 1,138,625 | Burnham | May 11, 1915 |
| 1,223,143 | Briggs | Apr. 17, 1917 |
| 1,318,220 | Mason | Oct. 7, 1919 |
| 1,347,546 | Larsh | July 27, 1920 |
| 1,389,716 | Van Vleet | Sept. 6, 1921 |
| 1,397,503 | Cosgray | Nov. 22, 1921 |
| 1,403,216 | Williams | Jan. 10, 1922 |
| 1,515,166 | Pardee | Nov. 11, 1924 |
| 1,560,803 | Miller | Nov. 10, 1925 |
| 1,662,366 | Cosgray | Mar. 13, 1928 |
| 1,704,966 | Witzel | Mar. 12, 1929 |
| 1,774,492 | Thorne | Aug. 26, 1930 |
| 1,776,683 | Larkin | Sept. 23, 1930 |
| 1,790,635 | Arendt | Jan. 27, 1931 |
| 1,869,555 | Frank | Aug. 2, 1932 |
| 1,871,926 | Starr | Aug. 16, 1932 |
| 1,875,358 | Sola | Sept. 6, 1932 |
| 1,909,139 | Wells | May 16, 1933 |
| 1,952,072 | Jewell | Mar. 27, 1934 |
| 1,965,371 | Drabelle | July 3, 1934 |
| 2,006,524 | Strong | July 2, 1935 |
| 2,148,227 | Antonsen | Feb. 21, 1939 |
| 2,165,969 | Humbert et al. | July 11, 1939 |
| 2,212,198 | Sola | Aug. 20, 1940 |